May 17, 1966 E. J. ONDECK 3,251,605
QUICK RELEASE CHUCK
Filed Sept. 26, 1963
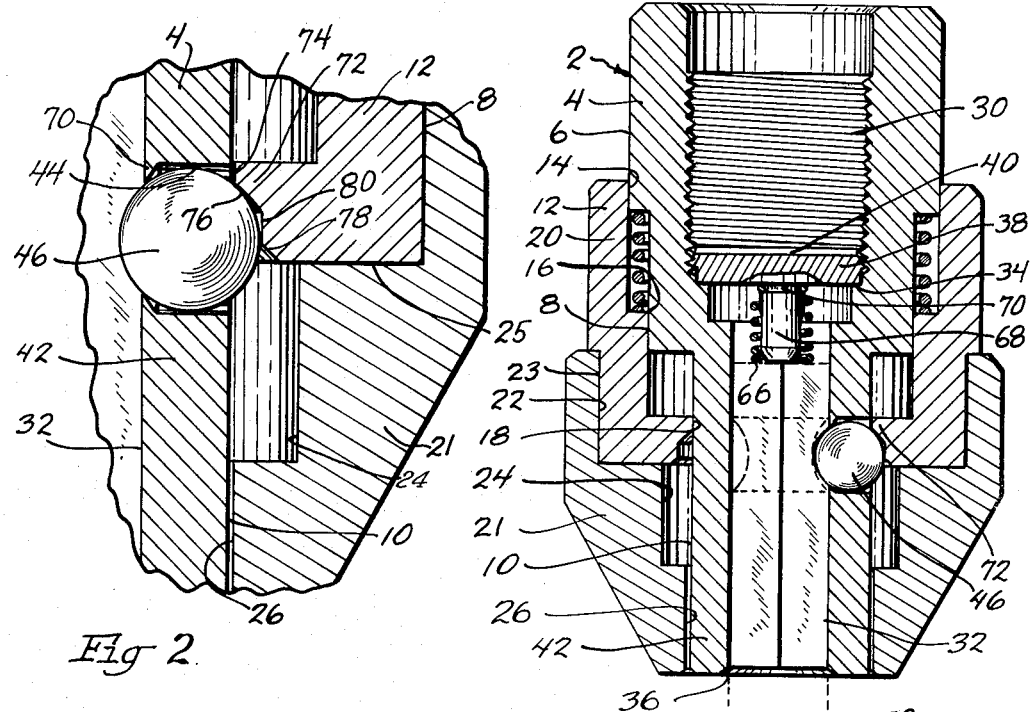
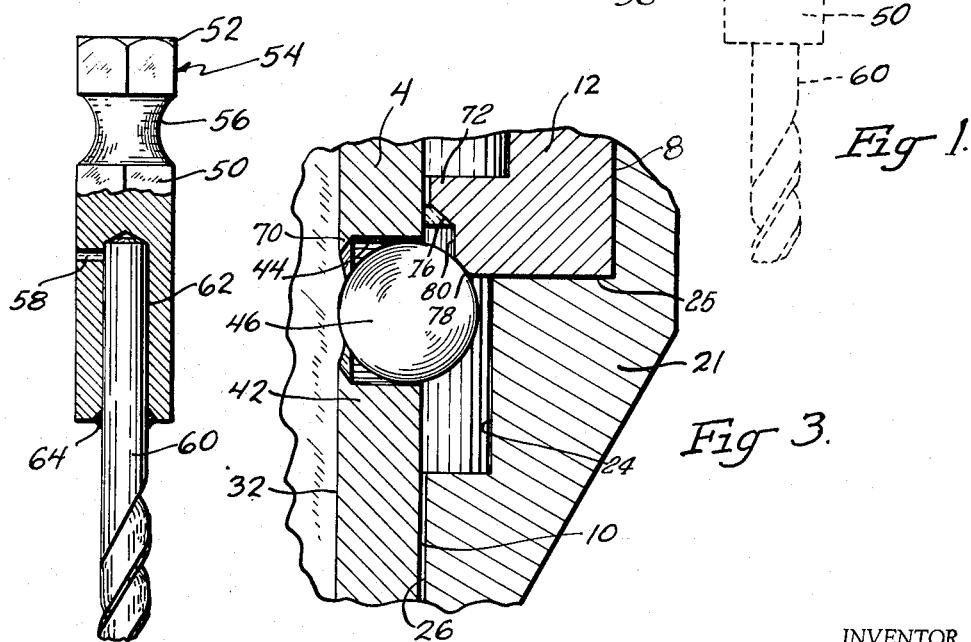
INVENTOR.
Elmer J. Ondeck
BY
Atty.

United States Patent Office 3,251,605
Patented May 17, 1966

3,251,605
QUICK RELEASE CHUCK
Elmer J. Ondeck, Riverside, Ill., assignor to Supreme Products Corporation, Chicago, Ill., a corporation of Illinois
Filed Sept. 26, 1963, Ser. No. 311,747
7 Claims. (Cl. 279—82)

This invention relates to tool holding chucks of the quick release type and more particularly to a chuck which can be manually released and engaged while running.

Chucks used to rotate expendable or interchangeable elements such as twist drills are used upon hand tools, power tools and heavy machinery to frictionally hold the elements against slippage under torque loads in a radially centered or aligned relationship.

Where tools are purchased by individual users such as home owners, shop and service men, expense and convenience are important considerations. Hand tightened or key tightened chucks are used for conveniently taking miscellaneous drill sizes within predetermined ranges. However, they require time to stop, loosen, change, tighten and start up again in order for them to operate acceptably. Moreover, keys or wrenches for key chucks are often misplaced or inadvertently left in the chuck and cause injury or damage on start up. With hand tightened chucks repeated changes become tiresome to the user because of the physical exertion required with gripping and twisting, such very often requiring a locking of the spindle against rotation.

In industrial tools various expedients are employed to hold tool elements in alignment and against slippage which involve careful attachment or detachment since production runs seldom require any changes except for breakage or resharpening, or if there are many changes then expensive devices are employed to accomplish savings in time and labor. Initial tool-up expense under these circumstances, of course, is a minor consideration.

However, where craftsmen and individuals are using tool elements interchangeably on hand or machine tool spindles with some rapidity, it has been found that the number of different tool sizes that will be interchanged in a given period of use for particular purposes are comparatively few, and, an object of the invention is to provide an improved chuck that is inexpensive to produce and use wherein a conventional chuck can be easily replaced by one embodying the invention to handle safely and without hazzard a series of tool elements of related sizes with positive anti-slippage elements unitarily attached thereto which are easily interchangeable with each other in the chuck in a non-rotative, self-centering relationship with a key or manual tightening or loosening and which provide a loose self-centering drive relationship with or without stopping the driving spindle.

Another object of this invention is to provide a chuck having a single integral intermediate element that is subjected to stress and strain thus, allowing other parts of the chuck to be produced without rigid manufacturing tolerances while assuring high precision alignment of the tool under work load.

A further object of this invention is to provide an improved chuck having a socket head portion for directly mating engagement or detachably receiving intermediate adapter elements to drive a variety of elements such as hex-headed bolts, screws and shafts for tightening or untightening operations.

Still another object of this invention is to provide an improved chuck wherein tool elements may be inserted which have been assembled by the owner or operator with an element mated to the chuck which can accept tool elements of the owner or operator's design.

A further object of the invention is to provide an improved chuck construction which is rugged for hard use, easily assembled and protected against fouling or any need of lubrication.

Other objects and advantages of my invention will become readily apparent from the following description and appended claims.

In the accompanying drawing:
FIG. 1 is a sectional view of the tool chuck embodying the invention taken axially thereof,
FIG. 2 is an enlarged sectional view of a portion of the tool chuck shown in FIG. 1 in its resting state,
FIG. 3 is a view like FIG. 2 showing the tool chuck elements actuated to receive a detachable tool, and
FIG. 4 is a side elevational view, partly in section, of the detachable tool received in the tool chuck.

Referring now to FIG. 1 of the drawing, a tool chuck constructed according to the teachings of my invention is indicated generally at 2 comprising an integral chuck body 4 with three external cylindrical surfaces 6, 8 and 10 of successively reduced diameter; a sleeve element 12 with three internal cylindrical surfaces 14, 16 and 18 slidably and rotatably engaging the external surfaces 6, 8 and 10 respectively with a compression spring 20 disposed between surfaces 8 and 14 urging dissociation of the chuck body and sleeve element and one external surface at 23; and, a skirt element 21 also having three internal cylindrical surfaces 22, 24 and 26. The surfaces 23 and 22 are press fitted together so that the sleeve and skirt elements are unitized while surface 26 slides in guided relation on the surface 10.

The body 4 has an axial bore therethrough with an enlarged threaded upper portion 30 and a reduced lower portion 32 defining an upwardly facing shoulder 34 and having an internal wall contour therebelow that is non-circular preferably hexagonal in its shape at its lower end portion. The mouth of the lower bore is chamfered to provide a tapered opening at 36 whose major diameter preferably is as great as the major sectional dimension of the non-circular bore portion 32. The upper portion of the lower bore may be cylindrical if desired to provide a close fitting relationship where alignment accuracy is of great importance, but as mentioned, the cross section at the lower end portion preferably is hex shaped as shown in the drawing. This confines the torque load to a single central rigid member and an Allen wrench of suitable size can be used to tighten and remove the chuck body 4 from a drive spindle when desired.

A tool stop 38 is threaded into the upper bore 30 to rest preferably against the shoulder 36, which position is attained by a screw driver (not shown) engaging in a kerf 40 in the top of the stop 38. Also the wall 42 of the lower end of the body 4 has one or more radial openings 44 therethrough (FIGS. 2 and 3) preferably three for a triangular centered support pattern to receive a ball 46 in each opening movable to a position intersecting the bore 32. One ball is shown by way of example.

The tool chuck also includes an improved removable adapter 50 (FIG. 4) made from non-circular rod stock mating with said bore 32, preferably hexagonal in cross section at its lower end and shaped to the same contour at its upper end as the upper end of the bore 32. The adapter is also chamfered at the top as at 52 to be guided in its insertion into bore 32 by the chamfer 36.

The adapter 50 is ultimately a part of a tool bit assembly 54 that is used with the chuck body and preferably is circumferentially grooved as at 56 with a curved or circular surface of revolution. This groove accommodates the radially movable ball 46. The assembly 54 can be furnished as shown, but preferably the adapter is supplied independently either already drilled out as shown or with a small pilot hole (not shown) axially therein and a radial vent opening 58 at the top thereof. In finalizing the adapter, the pilot hole guides the centering and axial direction of a drill 60 as the drill drills out the shank receiving hole 62 to the size of the shank to be received therein. The shank of the drill 60, or one like it, is then inserted into the hole 62 and secured rigidly in place at 64 by a low temperature braze thereby unitizing the bit and adapter to make the tool assembly described. The vent hole 58, preferably, is provided to intersect the bore 62 and vents any gas generated during the brazing operation. The braze temperature is low enough that it will not draw any tool steel temper. Thus, with adapter blanks a purchaser can make up his own series of drill sizes for any tasks he has at hand that require quick tool changes as where different sized holes are being drilled repeatedly, or a manufacturer or servicing organization can furnish tools for their personnel.

Moveover, it will be appreciated that with tool breakage, the broken bit can be replaced by use of a small, low temperature brazing machine and any drill size can be used down to the smallest without slippage between it and the adapter. The vent hole 58 permits ready movement between the elements when under brazing heat.

It will be observed that end thrust from the spindle to the adapter exerted by drill feed pressure is carried by the stop plate 38 that is threaded into the bore 30 to an adjusted depth or with the end of the spindle itself (not shown), if desired, backing up the plate, and in either case with or without an ejection spring 66. Thus, the load upon the ball 46 is quite light at all times.

Although the stop plate 38 can be a shouldered ring having an opening therethrough with the upper end of of compression spring extending below its lower surface, it is preferred as shown in FIG. 1 that a spring be mounted on the bottom face of the stop plate by means of a boss or projection 68. The boss carries the end thrust of the tool with the compression spring telescoping over it when an adapter 54 is in place. A groove 70 at its top receives the top turn of the spring in supported relationship. The spring assists gravity if the tool spindle is in depending position, but since the spindle may be disposed at any angle if portable, the spring dislodges the adapter from its ball retained position so that one hand operation of the skirt sleeve will cause release of the adapter from ball restraint position so that the skirt sleeve can then be released and the drill unit thereafter lifted out by the same hand if the other one is occupied.

More particularly, in connection with the operation of the ball 46 the opening 44 is located at the level desired for intersection of the balls 46 with the groove 56, and the outer ends of each opening is counter bored to a size receiving the balls, but only to a depth that leaves a tapered flange or shoulder 70 (FIG. 2) which permits the balls to intersect the bore 32 to a limited extent. Thus, each ball 46 is free to project into the adapter groove 56. Preferably, the shoulders are so arranged that the balls 46 engage the shoulders before reaching the bottom of the groove in which position they are axially halfway through the opening 44 where they extend inwardly far enough to intercept the groove 46 and far enough outwardly to extend the same distance beyond the outer cylindrical surface 10 of the body 4 where their position and radial movement are controlled by the sleeve 12.

As mentioned, the sleeve 12 is axially slidably and rotatably mounted on the body 4 with respect to the surface 18 on surface 10. The surface 18 is located on a radial flange 72 whose minor diameter approximates that of the surface 10 at 74 and whose remaining inner face defines two radially and axially spaced tapering surfaces 76 and 78 which are separated by a cylindrical surface or dwell 80 (FIG. 2). Both surfaces define a downwardly and outwardly inclined cam surface. The lower end of the lower surface 78 has the largest diameter so that the lower end of the sleeve serves as a cam element for the ball 46 inwardly with downward movement of the sleeve 12 while the upper end of the upper surface 76 has the smallest diameter so that the radial flange 72 serves as a stop member engaging the ball to limit downward movement of the sleeve 12.

The lower end of the skirt sleeve is received slidably upon the lower end of the chuck body in guided relationship and is coterminus with the body in its resting position to protect the body from damage and contamination.

The construction is better understood when the method of assembly is noted, namely, that with the balls 46 absent and the spring 20 in place, the sleeve 12 is slipped into place over the lower end of the body 4 and pushed upwardly until the openings 44 are uncovered whereupon the balls 46 are inserted in the openings and the sleeve released. The sleeve will be urged downwardly by the spring 20 and cam 78 will cam the balls inwardly from the position shown in FIG. 3 to that shown in FIG. 2 until the cam 76 engages the ball or balls and is supported in turn thereby with the balls 46 engaging the shoulders 70.

Thereupon the skirt 21 is slipped into place and press fitted onto the lower end of the sleeve 12 to unitize the chuck assembly. This is accomplished by the cylindrical surfaces having diameters providing a telescoping interference between the two surfaces 22 and 23. The interference need only be mild and a shoulder 25 on this skirt serves as a stop limit for the press fit. The press fit, thus, is one which can be released and re-established whenever it is desirable to service the chuck if it becomes damaged.

In operation the skirt 21 is grasped and forced upwardly until the chuck is oriented as shown in FIG. 3, thereby compressing spring 20 and releasing the balls 46 for outward movement from the shoulders 70 to receive the adapter of a tool bit assembly. Balls 46 are cammed out of hex bore 32 by the adapter chamber 52 and into engagement with the cam 78 of flange 72. The adatper compresses spring 66 and the skirt sleeve can be released allowing spring 66 to expand. Sleeve 12 now exerts a force through cam 78 on ball 46 urging it against the side wall of hex adapter 50 or into the groove 56 when such coincides. When the adapter has been inserted to a point where groove 56 is aligned with opening 44, ball 46 enters the groove until stopped by shoulders 70. This lateral travel by ball 46 allows it to clear cam 78. Sleeve 12 is now urged downwardly by spring 66 until cam 76 engages ball 46. The dwell 80 holds the ball 46 in working position. The tool is now ready for tool feed operation. The tool bit assembly 54 likewise is removed by forcing sleeve 12 upward as previously described and reversing the assembly steps. Tension by cam 76 and dwell 80 against ball 46 is now removed and the bit and adapter are free to drop out or be revomed from the chuck. In thus removing the adapter the ball 46 is pushed out of hex bore 32 by the roundness of groove 56.

Removal of the tool bit and adapter however, is materially enhanced by the addition of spring 66. Threaded stop plate 38 is provided with a central projection 68 facing toward hex bore 32. The projection 68 is bullet nosed and is provided with an annular groove 70 as already mentioned. The lower end of spring 66 protrudes into the hex bore 32 and is engaged and compressed by insertion of the tool bit assembly. When the sleeve 21 is then forced upward for removal of the tool bit assembly, spring 66 expands and ejects the assembly 54 from the chuck.

With this arrangement the tool bit may be removed while the chuck is still rotating by grasping sleeve 21 which does not rotationally engage the chuck body 4 but is merely frictionally carried by the chuck. Grasping of the sleeve arrests its rotation and subsequent forcing upward of the sleeve allows the spring stop assembly to eject the tool bit without the inherent danger to the operator should he attempt to manually withdraw the tool bit while it is still rotating.

Having thus described the preferred embodiment of the invention as related to the objects set forth, it will be readily apparent to those skilled in the art that further changes therein can be made without departing from the spirit of the invention, the scope of which is commensurate with the claims.

What is claimed is:

1. For use with a unitary tool having a hexagonal adapter portion with a circumferential groove therein and a rotary tool element with its shank rigidly supported axially in said adapter, a chuck for detachably receiving the adapter comprising a chuck body having a threaded upper axial bore and a lower bore having an opening through a wall thereof, said lower bore being in axial alignment with said upper bore and having a hexagonal shape receiving said adapter in rotary drive interengagement, a sleeve slidably and rotatably mounted on said body, a spring having one end engaging said body and its opposite end urging said sleeve to one limit of its slidable movement, a dwell on said sleeve opposite said opening at said limit of movement, a cam element tapering to one of the axial edges of said dwell, a stop member adjacent to the other axial edge of said dwell, said opening having a reduced shoulder at the intersection of said opening and the lower bore, a ball of slightly smaller diameter than said opening but larger than said reduced shoulder adapted to travel radially in said opening, said cam element and said stop member engaging said ball alternatively, said cam element under the influence of said spring forcing said ball against said reduced shoulder of said opening and into said groove of said tool element when said tool element is inserted in said chuck body and said groove is in registry with said opening, said stop member and dwell acting on said ball to retain the ball against said reduced shoulder and in said groove, an ejector assembly disposed between said bores including a resilient element a part of which is positioned in said lower bore and cooperates with said tool element whereby said resilient element is stressed by said adapter when said groove is in registry with said opening.

2. The combination called for in claim 1 in which said ejector assembly includes a stop plate threaded in said upper axial bore having a portion engaging said adapter in work feed supporting relationship and carrying said resilient element.

3. In a tool chuck for driving a tool element having a hexagonal shank with a circumferential groove thereon, a chuck body having a threaded upper axial bore, a hexagonal shaped lower bore in axial alignment with said upper bore and having an opening through a wall thereof, a sleeve slidable on said body, a spring surrounding said body having one end engaging said body and its opposite end urging said sleeve to one limit of its slidable movement, said sleeve having an internal cylindrical dwell thereon opposite said opening at said limit of movement and a cam element at each axial edge thereof, said opening having a reduced shoulder at the intersection of said opening and the lower bore, a ball of slightly smaller diameter than said passage but larger than said reduced shoulder adapted to travel in said passage, said cam elements engaging said ball alternatively, one of said cam elements acting to force said ball against said reduced shoulder of said passage and into said groove of said tool element when said tool element is inserted in said chuck body and said groove is in registry with said opening, the second of said cam elements acting on said ball to retain the ball against said shoulders and in said groove, an ejector assembly positioned between said bores including a resilient element, a part of which is positioned in said lower bore and cooperates with said tool element whereby said resilient element is stressed by said tool element when said groove is in registry with said opening.

4. In a quick release chuck, an elongated body having radially spaced external cylindrical wall portions defining a shoulder between them and having an axial bore therethrough, means in the top portion of the bore for securing the body to a drive spindle, a non-circular wall contour in the lower portion of said bore, a radial opening in the side of the wall of said lower portion, a ball in said opening having a diameter greater than the thickness of the wall of said lower portion, sleeve means externally mounted slidably on said cylindrical wall portions defining a second shoulder opposing the first mentioned shoulder and having a portion passing over said opening including a cylindrical portion providing a cylindrical dwell radially spaced from said wall a distance approximately one-half of the difference between the diameter of the ball and the thickness of said wall portion adjacent thereto, a compression spring between said shoulder, a cam element leading to said dwell for moving the ball radially inwardly, under the force of said compression spring, a stop member engaged by said ball located above said dwell and limiting movement of the sleeve means in a downward direction, means in said axial bore intermediate its top and lower portions for transmitting feed movement from said body to a tool received in said non-circular wall contour and including a spring urging ejection of a tool against the restraint of said ball.

5. A tool chuck for driving a unitary tool element having a hexagonal shank with a circumferential groove thereon, said chuck comprising a chuck body having an upper axial bore, a hexagonal shaped lower bore in axial alignment with said upper bore and chamfered at its lower end to a radius at least as great as the major radius of said hexagonal bore, a sleeve slidably and rotatably mounted on said body, a spring having one end engaging said body and its opposite end urging said sleeve to one limit of its slidable movement, said sleeve having an internal cylindrical dwell thereon opposite said opening at said limit of movement and a cam element tapering to one of the axial edges thereof, said opening having a reduced shoulder at the intersection of said opening and the lower bore, a ball of slightly smaller diameter than said opening but larger than said reduced shoulder adapted to travel in said opening, said cam element engaging said ball when said sleeve is away from said limit and acting to force said ball against said reduced shoulder of said opening and into said groove of said tool element when said tool element is inserted in said chuck body and said groove is moved into registry with said opening, a skirt press fitted to the sleeve and disposed co-terminus with the lower end of the sleeve when said sleeve is disposed at its said limit of movement, stop member on said sleeve at the other edge of said dwell engaging the ball when said skirt and chuck body are in co-terminus position, said unitary tool element including adapter and a drill supported thereby wherein said adapter has a central bore receiving the shank of said drill in axially aligned relationship and a hexagonal external contour concentric therewith whose minor radial dimension is greater than the radius of the drill shank, and means rigidly receiving said drill shank in said bore, said adapter having a circumferential groove intermediate its end of a radius less than said minor radius separating said hexagonal contour into an upper and lower portion, and the upper portion terminating in a chamber of a terminal radius equal at least to said minor radius, said hexagonal contours mating with each other in self-centering rotary drive relationship.

6. In combination a rotatable chuck body having a tool receiving bore axially therein and a radial opening through the wall intersecting the bore, a shoulder element of reduced diameter in said opening at said intersection, a sleeve slidably and rotatably mounted on the exterior of said chuck body assembled thereon over an end of said body and movable over and past said opening to a retracted position clearing said opening, a ball received in said opening when said sleeve clears said opening in its retracted position, a spring for urging said sleeve from its retracted position to a resting position covering said opening, means carried by said sleeve for retaining said ball in said opening including a stop member for holding both the ball against said shoulder and said sleeve in said resting position against disassembly, and a skirt element secured to said sleeve as a unitary assembly therewith and defining a recess at the end of the sleeve spaced radially and axially from said stop member, said skirt element being engaged by the ball when said sleeve is moved to its retracted position clearing said opening and the ball moves radially to a position clearing said bore.

7. The combination called for in claim 6 in which said sleeve includes a cylindrical dwell member between said stop element and said end of the sleeve engaged by said ball simultaneously with said stop member when the sleeve is in resting position and having an effective diameter holding the ball in a position projecting into said bore.

References Cited by the Examiner

UNITED STATES PATENTS

| 1,642,490 | 9/1927 | Decker | 279—82 |
| 2,135,861 | 11/1938 | Thompson | 279—75 |
| 2,308,990 | 1/1943 | Mellon | 77—60 |
| 2,361,683 | 10/1944 | Greenberg | 77—60 |
| 2,728,365 | 12/1955 | Austin | 279—75 |
| 2,807,473 | 9/1957 | Kiehne | 279—75 |
| 2,926,020 | 2/1960 | Dayton | 279—75 |
| 2,970,844 | 2/1961 | Better | 279—75 |

FOREIGN PATENTS 35,610   2/1926   Denmark.

LESTER M. SWINGLE, *Primary Examiner.*
ROBERT C. RIORDON, *Examiner.*
H. V. STAHLHUTH, *Assistant Examiner.*